(12) United States Patent
Xu et al.

(10) Patent No.: US 11,807,998 B2
(45) Date of Patent: Nov. 7, 2023

(54) DANGLING NET CLOTH DEVICE FOR SUPPRESSING FLUTTER OF SEA-CROSSING BRIDGE

(71) Applicant: DALIAN UNIVERSITY OF TECHNOLOGY, Liaoning (CN)

(72) Inventors: Fuyou Xu, Liaoning (CN); Minshan Pei, Liaoning (CN); Gao Liu, Liaoning (CN); Wenjie Li, Liaoning (CN); Taotao Mao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 62 days.

(21) Appl. No.: 17/777,773

(22) PCT Filed: Feb. 22, 2021

(86) PCT No.: PCT/CN2021/077162
§ 371 (c)(1),
(2) Date: May 18, 2022

(87) PCT Pub. No.: WO2022/165862
PCT Pub. Date: Aug. 11, 2022

(65) Prior Publication Data
US 2023/0160159 A1    May 25, 2023

(30) Foreign Application Priority Data
Feb. 3, 2021  (CN) .......................... 202110149497.3

(51) Int. Cl.
*E01D 19/00* (2006.01)
*F16F 7/10* (2006.01)

(52) U.S. Cl.
CPC ................ *E01D 19/00* (2013.01); *F16F 7/10* (2013.01); *F16F 2222/08* (2013.01); *F16F 2230/0005* (2013.01)

(58) Field of Classification Search
None
See application file for complete search history.

(56) References Cited

U.S. PATENT DOCUMENTS 4,741,063 A * 5/1988 Diana ..................... E01D 11/02
14/18

FOREIGN PATENT DOCUMENTS

CN    101260646 A    9/2008
CN    108589511 A    9/2018
(Continued)

*Primary Examiner* — Melanie Torres Williams
(74) *Attorney, Agent, or Firm* — Muncy, Geissler, Olds & Lowe, P.C.

(57) ABSTRACT

The present invention belongs to the technical field of wind-induced vibration control study of bridges, and provides a dangling net cloth device for suppressing flutter of a sea-crossing bridge, i.e., a large-area dangling net cloth equipped with multiple balance weights, which is suspended below a girder by ropes and is immersed in water. When wind-induced vibration occurs on a bridge, the device is driven to move in the water, and gravity of the device as well as a huge additional mass force and an additional damping force produced by the water on the net cloth will do negative work on the girder to consume vibration energy of the bridge and effectively suppress large vibration of the bridge. The device adopts lightweight standardized components which are convenient to install, detach, transport, and store, and has the advantages of safety, reliability, economy, and practicality.

10 Claims, 2 Drawing Sheets

(56) References Cited

FOREIGN PATENT DOCUMENTS

| | | | | | |
|---|---|---|---|---|---|
| CN | 108797353 | B | * | 10/2020 | ............. E01D 21/00 |
| CN | 212321039 | U | * | 1/2021 | |
| CN | 112942151 | A | * | 6/2021 | ............. E01D 11/02 |
| JP | H08100410 | A | | 4/1996 | |
| JP | H10141432 | A | | 5/1998 | |
| JP | H1129906 | A | | 2/1999 | |
| JP | H1193114 | A | | 4/1999 | |

* cited by examiner

DANGLING NET CLOTH DEVICE FOR SUPPRESSING FLUTTER OF SEA-CROSSING BRIDGE

TECHNICAL FIELD

The present invention belongs to the technical field of wind-induced vibration control study of bridges, and relates to a dangling net cloth device for suppressing flutter of a sea-crossing bridge.

BACKGROUND

Modern bridges are developing towards longer spans and more flexibility. Many long-span sea-crossing bridges have been built at home and abroad, and more long-span sea-crossing bridges will be built in the future. The structural stiffness and damping of long-span bridges are relatively small and sensitive to wind load. High speed and long duration of wind at sea have posed a severe challenge to the wind-resistant safety of the bridges. Wind-induced large limit cycle vibration and divergent flutter of the long-span bridges need to be eliminated. Flutter control measures of the bridges mainly include aerodynamic measures, structural measures, and mechanical measures. In view of the defects of traditional flutter control measures of long-span bridges, the inventor proposes a dangling plate damper device suitable for suppressing flutter of a long-span sea-crossing bridge, i.e., a dangling plate immersed in water is suspended below a bridge, and when the bridge vibrates, the large flutter of the bridge is suppressed via a huge additional mass and additional damping provided by the water. However, the device still has some defects: (1) in order to provide a sufficient large water drag force, the dangling plate with a large enough size is required, and in order to ensure the stiffness of the dangling plate, it is necessary to increase the thickness or size of the plate or arrange stiffening ribs or truss systems, thus the project cost is greatly increased, and the practicality and economy of the device are reduced; (2) the device is large in size, is inconvenient to remove and install, and thus will cause a potential safety hazard after long-term positioning at the bottom of the girder; (3) in order to reduce the project cost, it is necessary to reduce the mass of the dangling plate as much as possible; on one hand, when the dangling plate rises, the work done by the self weight thereof is less; on the other hand, the sinking speed is low due to the action of the water drag force, and the sinking is difficult to synchronize with the downward movement of a the girder; therefore, negative work cannot be guaranteed in a half cycle of upward movement of the girder, which results in less energy consumption and lower control efficiency. In view of the above defects, the present invention improves and optimizes the measures in several aspects, and makes the measures have simpler construction, more convenient installation, lower cost, and higher control efficiency, thus having relative advantage and characteristics.

SUMMARY

A technical problem to be solved by the present invention is to propose a dangling net cloth device which is suspended below a bridge, immersed in water and equipped with multiple balance weights aiming at the need of flutter control of a long-span bridge crossing a sea (a river or a deep lake). When wind-induced vibration occurs on the bridge, the device is driven to move in the water, and a drag force is produced when the device moves upward with the girder, which will do negative work on the girder to consume vibration energy of the bridge and suppress large vibration of the bridge. The specific working process is: when the girder moves upward, the dangling net cloth device is driven to move upward in the water, the device is subject to a drag force in a direction opposite to the moving direction (vertical downward), the drag force mainly comprises: self weight of the device, an additional damping force of the water and an additional mass force, and these forces do negative work on the bridge to consume the vibration energy of the bridge in a rising process of the device; when the girder moves downward, the dangling net cloth device moves downward under the action of gravity, buoyancy and water drag force; if the moving speed of the device is lower than that of the girder, the device will neither exert a pulling force on the girder, nor do positive work on the girder; on the contrary, in this descending process, if a pulling force is generated between the device and the girder, energy will be input to the girder, and the vibration amplitude of the girder will be increased; as net cloth is relatively light, the net cloth will sink slowly under the action of self weight and water drag force; although no positive work will be done on the girder, ropes connecting the girder to the net cloth will be loosened and the girder will vibrate to a lowest point; and the ropes will be tightened again after the net cloth rises by a considerable distance, which will certainly reduce the efficiency of energy consumption. Therefore, an optimal situation is to completely synchronize the descending speed of the device with that of the girder, followed by a next cycle of movement, and make the device function immediately. Therefore, the device needs to be provided with balance weights to get as close as possible to realize the above ideal objective. This is easily achieved by adding cheap concrete balance weights, and the energy consumption is also increased by the balance weights due to the gravity in the rising process, thus the weight of other components of the device is minimized, and the project cost is reduced. In the descending process, the balance weights are mainly used to accelerate the descending speed of the net cloth, so as to strive for nearly synchronous descent of the net cloth and the girder, make the ropes neither too loose, nor too tensioned, and ensure the control efficiency of the next cycle, which can kill two birds with one stone. It should be noted that as the vibration amplitude of the girder is variable, it is impossible to design suitable balance weights to ensure that the descent of the net cloth and the descent of the girder are synchronized in all conditions. If the balance weights are too heavy, the cable force will be too large, and energy will be input to the girder; if the balance weights are too light, the ropes are too loose, and the energy of the girder cannot be consumed in time in the rising process. The balance weights are optimized and designed according to the parameters such as the vibration frequency and amplitude of the girder, and the quality and size of the net cloth. Using the device, the flutter of the bridge can be avoided more conveniently and efficiently, and the critical wind speed of flutter and wind-resistant safety is greatly improved.

The technical solution of the present invention is as follows:

A dangling net cloth device for suppressing the flutter of a sea-crossing bridge, comprising cable chains 1, first buckles 2, node connectors 3, net material 4, high-strength cloth 5, balance weights 6, ropes 7, second buckles 8, and suspension rings 9; the cable chains 1 have sufficient strength and stiffness, and are generally galvanized metal chains or high-strength nylon fiber ropes, thus can greatly reduce the cost; each cable chain 1 is connected with the node connectors 3 through the first buckles 2 arranged on both ends; a criss-crossed network system is easily and quickly formed by a plurality of cable chains 1, first buckles 2, and node connectors 3 with uniform specifications (which are convenient for large-scale assembly line operation, so that the cost is greatly reduced) to provide support for a control device; a plurality pieces of net material 4 with a uniform specification are laid above the network system, and is easily and quickly connected with the cable chains 1 through a variety of ways (such as straps or buckles) to form a denser and more integrated cable net; the water-impermeable high-strength cloth (5) is laid above the cable net and connected with the cable net to form integrated net cloth; the combined device is not only convenient to make, transport, and install, but also gives full play to the advantages of each component and plays the role of rigid dangling plates on the premise of less cost; the balance weights 6 are suspended below the node connectors 3; each rope 7 is provided with the second buckles 8 on both ends, connected with a node connector 3 on the lower end, and connected with a suspension ring 9 fixed below the girder on the upper end, thus the control device is suspended below the girder and immersed in water; for a bridge already built, the suspension rings 9 are added to the bottom of the girder in a later phase; and for an unbuilt bridge, the suspension rings 9 is arranged in advance when making the girder. As various components of the dangling net cloth device are made by a standardized production process, the connection is convenient. The cable net has low self weight, which is not only convenient to transport, install, and remove, but also saves investment. The balance weights 6 are made of concrete, so the cost is very low. The device is removed and stored when not used; In strong wind (which can generally be predicted according to weather forecast, and is a threat to flutter and large buffeting of a bridge) conditions, the dangling net cloth control device is assembled in a factory and then transported to a site, or the components are transported to the site for quick splicing and installation. Under the action of wind load, when the bridge moves upward, the control device is driven to move upward in the water, and the movement of the bridge will be suppressed by the self weight of the device as well as additional mass and additional damping provided by the water; when the bridge moves downward, the control device moves downward under the action of self weight, buoyancy and water drag force, and the descending speed of the control device is nearly synchronous with that of the girder, so as to input energy as little as possible to the girder, or avoid excessive looseness of the ropes as far as possible, and ensure a relatively high control efficiency.

The shape of the net cloth of the device is not limited, and is generally rectangular;

The size of the net cloth of the device is not limited, the width along the transverse direction of the bridge is 5-10 m, the length along the longitudinal direction of the bridge is determined according to actual vibration characteristics of the bridge and control objective and is from ten meters to tens of meters, and the net cloth is arranged at intervals or continuously as a whole; the device is generally arranged at a position (such as a ½ section and two ¼ sections of a main span) where a bridge structure may have a large displacement; at this position, two identical control devices are arranged symmetrically along the transverse direction, are arranged on both sides of the girder as far as possible, and are more beneficial to control torsional vibration of the bridge; and the immersion depth shall not be too small (which will result in low efficiency) or too large (which will result in high cost), and is determined according to site conditions.

The cable chains 1 generally have a length of 2-4 m;

The first buckles 2 and the second buckles 8 are easy to control to open and close, are convenient to install and remove, and are ensured to have sufficient strength and stiffness;

The node connectors 3 are mainly used to connect the vertical and horizontal cable chains 1, provide suspension points for suspending the device and the balance weights 6, is usually made of high-strength galvanized steel, and are ensured to have sufficient strength, stiffness and number;

The net material 4 is mainly used to support the high-strength cloth 5, and usually use a metal net or a high-strength nylon rope net;

The high-strength cloth 5 has high corrosion resistance, canvas is recommended due to the advantages such as light weight, high strength, low price, and good durability;

The balance weights 6 is usually reinforced concrete blocks in order to reduce project cost, the mass thereof is not limited and can be considered to be 2 t-5 t for the convenience of installation and removal, and the number thereof is determined according to the actual vibration characteristics of the bridge and the size of the net cloth; the balance weights 6 shall be suspended below the node connectors 3 in the form of small mass, large number and symmetrically dispersed arrangement as far as possible on the premise of meeting the requirements of total balance weight, so as to avoid a large concentrated force at a node of the net cloth or at a suspension point of the suspension ring 9 on the girder;

The ropes 7 shall have sufficient strength and stiffness with as little deformation as possible in a working condition, and the number thereof is determined according to the size of the net cloth, the number of the node connectors 3 and the number of the balance weights 6; if conditions permit, each node connector 3 is connected with one vertical rope 7, so as to avoid the problem that an actual working face is reduced by serious concaveness of the net cloth due to oversize of the net cloth or excessive tension produced by a plurality of balance weights 6;

The suspension rings 9 are arranged in a checkerboard layout, and the numbers in horizontal and vertical directions are at least 4 respectively, so as to reduce the large concentrated force produced by the suspension points on the girder; but the numbers shall not be too large, otherwise the workload will be heavy, and more ropes 7 will be needed, which will increase the cost;

As various components of the dangling net cloth device is made by a standardized production process, the connection is convenient. The cable net has low self weight, which is not only convenient to transport, install and remove, but also saves investment. The balance weights 6 are made of concrete, so the cost is very low. The device can be removed and stored when not used; In strong wind (which can generally be predicted according to weather forecast, and is a threat to flutter and large buffeting of a bridge) conditions, the dangling net cloth control device is transported to a site after being assembled in a factory, or the components is transported to the site for quick splicing and installation. Under the action of wind load, when the bridge moves upward, the control device is driven to move upward in the water, and the movement of the bridge will be suppressed by the self weight of the device as well as additional mass and additional damping provided by the water; when the bridge moves downward, the control device moves downward under the action of self weight, buoyancy and water drag force, and the descending speed of the control device is nearly synchronous with that of the girder, so as to input energy as little as possible to the girder, or avoid excessive looseness of the ropes as far as possible, and ensure a relatively high control efficiency. The device is generally arranged at a position (such as a ½ section and two ¼ sections of a main span) where a bridge structure may have a large displacement; at this position, two identical control devices are arranged symmetrically along the transverse direction, thus vertical vibration and torsional vibration of the girder can be controlled simultaneously.

The dangling net cloth control device for suppressing the flutter of a bridge provided by the present invention is convenient to remove, install, debug, and use, can meet the needs of vertical and torsional flutter control of the bridge simultaneously, and is convenient, ready-to-use, safe, and practical. If no navigation requirement is posed or the navigation requirement is relatively low, the present invention can be used to suppress wind-induced buffeting and vortex-induced vibration in construction phase and completed bridge operation phase, to suppress vehicle-induced vibration, and even to reduce earthquake response.

The present invention has the following beneficial effects: (1) the dangling net cloth device provided by the present invention has a simple structure, is economic and practical, and needs no complex equipment or special material; the components have uniform specifications, which can achieve standardized and large-scale assembly line operation, so that the project cost is greatly reduced; in addition, the components have small sizes, light weights, and are convenient to transport, install, remove, and store; (2) the device does not need to be positioned below the girder for a long term, but only need to be used in a strong wind condition or when obvious vortex-induced vibration is observed on site, so the safety is higher; (3) the device has high control efficiency, the mass of the balance weights is optimized and designed according to the parameters such as the vibration frequency and amplitude of the girder, the quality and size of the net cloth, etc.; compared with a traditional rigid dangling plate control device, the control effect is greatly improved.

In the figures: 1 cable chain; 2 first buckle; 3 node connector; 4 net material; 5 high-strength cloth; 6 balance weight; 7 rope; 8 second buckle; 9 suspension ring.

DETAILED DESCRIPTION

Specific embodiments of the present invention are described below in detail in combination with the technical solution and accompanying drawings, but the implementation of the present invention is not limited to this.

Figure 1:
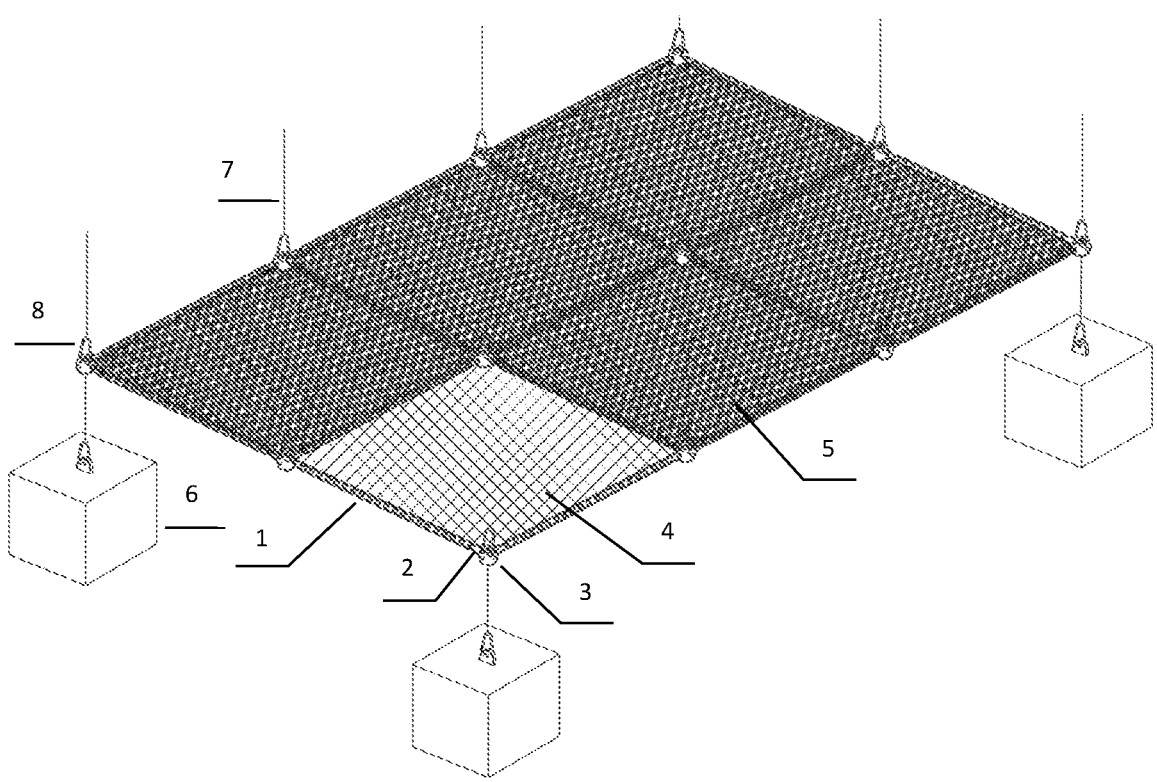
FIG. 1 is a local structural diagram of a dangling net cloth device for suppressing flutter of a sea-crossing bridge.
Figure 2:
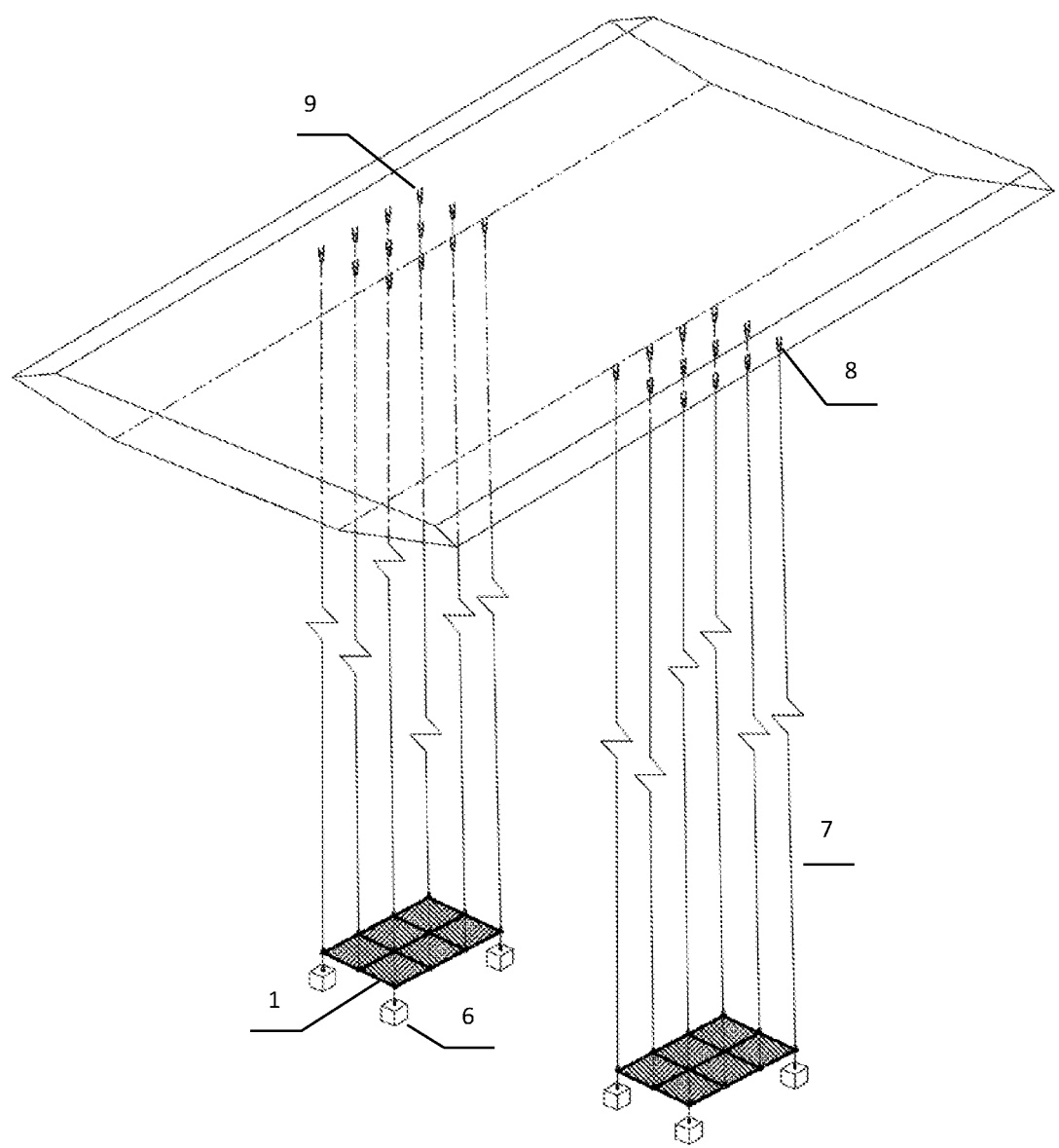
FIG. 2 is an overall structural diagram of a dangling net cloth device for suppressing flutter of a sea-crossing bridge.
Figure 3:
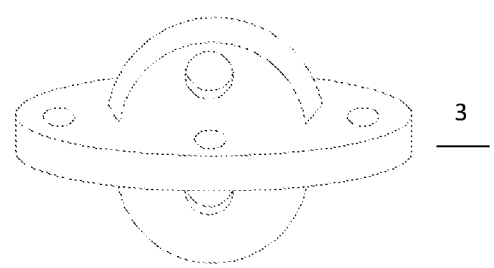
FIG. 3 is a schematic diagram of a node connector 3.

As shown in FIGS. 1, 2 and 3, a dangling net cloth device for suppressing flutter of a sea-crossing bridge, comprising cable chains 1, first buckles 2, node connectors 3, net material 4, high-strength cloth 5, balance weights 6, ropes 7, second buckles 8 and suspension rings 9; the cable chains 1 have sufficient strength and stiffness, and are generally galvanized metal chains or high-strength nylon fiber ropes, thus can greatly reduce the cost; each cable chain 1 is connected with the node connectors 3 through the first buckles 2 arranged on both ends; a criss-crossed network system is easily and quickly formed by a plurality of cable chains 1, first buckles 2 and node connectors 3 with uniform specifications (which are convenient for large-scale assembly line operation, so that the cost is greatly reduced) to provide support for a control device; a plurality pieces of net material 4 with a uniform specification are laid above the network system, and is easily and quickly connected with the cable chains 1 through a variety of ways (such as straps or buckles) to form a denser and more integrated cable net; the water-impermeable high-strength cloth (5) is laid above the cable net and connected with the cable net to form integrated net cloth; the balance weights 6 are suspended below the node connectors 3; each rope 7 is provided with the second buckles 8 on both ends, connected with a node connector 3 on the lower end, and connected with a suspension ring 9 fixed below a girder on the upper end, thus the control device is suspended below the girder and immersed in water; for a bridge already built, the suspension rings 9 are added to the bottom of the girder in a later phase; and for an unbuilt bridge, the suspension rings 9 is arranged in advance when making the girder.

If the strength and tensile stiffness of the cloth 5 are high enough, the first buckles 2 is directly used to connect the high-strength cloth to the node connectors 3 without using the cable chains 1 and even without using the net material 4. The advantage is that the material cost as well as the installation and removal costs of the cable chains 1 and the net material 4 are saved, and time is saved; the disadvantage is that the high-strength cloth 5 needs to be thick enough to have sufficient strength and stiffness, and more suspension points need to be arranged, thus the number of cable chains 1 needs to be increased accordingly. Many factors such as material cost, construction cost and safety should be considered to determine a final solution through optimization and design.

The above only describes preferred embodiments of the present invention and is not intended to limit the present invention in any form. Any equivalent change, modification or evolution made to the above embodiments by those skilled in the art through the technical solutions of the present invention shall still belong to the scope of the technical solutions of the present invention.

The invention claimed is:

1. A dangling net cloth device for suppressing flutter of a sea-crossing bridge, wherein the dangling net cloth device for suppressing flutter of a sea-crossing bridge comprises cable chains, first buckles, node connectors, net material, high-strength cloth, balance weights, ropes, second buckles and suspension rings; each cable chain is connected with the node connectors through the first buckles arranged on both ends; a criss-crossed network system is formed by a plurality of cable chains, first buckles and node connectors to provide support for the dangling net cloth device; the net material is laid above the network system and is connected with the cable chains to form a cable net; the water-impermeable high-strength cloth is laid above the cable net and connected with the cable net to form integrated net cloth; the balance weights are suspended below the node connectors; each rope is provided with the second buckles on both ends, connected with a node connector on the lower end, and connected with a suspension ring fixed below a main beam on the upper end, thus the dangling net cloth device is suspended below the main beam and immersed in water; for a bridge already built, the suspension rings are added to the bottom of the main beam in a later phase; and for an unbuilt bridge, the suspension rings are arranged in advance when making the main beam.

2. The dangling net cloth device for suppressing flutter of a sea-crossing bridge according to claim 1, wherein in a condition that strength and tensile stiffness of the cloth are high enough, the first buckles are directly used to connect the high-strength cloth to the node connectors without using the cable chains and the net material.

3. The dangling net cloth device for suppressing flutter of a sea-crossing bridge according to claim 1, wherein the dangling net cloth device is rectangular, the size thereof is not limited, the width along the transverse direction of a bridge is 5-10 m, the length along the longitudinal direction of the bridge is determined according to actual vibration characteristics of the bridge and control objective, and the dangling net cloth device is arranged at intervals or continuously as a whole; the dangling net cloth device is arranged at a position where a bridge structure may have a large displacement; at this position, two identical dangling net cloth devices are arranged symmetrically along the transverse direction on both sides of the main beam; and immersion depth is determined according to site conditions.

4. The dangling net cloth device for suppressing flutter of a sea-crossing bridge according to claim 1,
wherein the number of the ropes is determined according to the size of the net cloth, the number of the node connectors and the number of the balance weights; if conditions permit, each node connector is connected with one vertical rope.

5. The dangling net cloth device for suppressing flutter of a sea-crossing bridge according to claim 3,
wherein the number of the ropes is determined according to the size of the net cloth, the number of the node connectors and the number of the balance weights; if conditions permit, each node connector is connected with one vertical rope.

6. The dangling net cloth device for suppressing flutter of a sea-crossing bridge according to claim 1, wherein the suspension rings are arranged in a checkerboard layout, and numbers in horizontal and vertical directions are at least 4 respectively.

7. The dangling net cloth device for suppressing flutter of a sea-crossing bridge according to claim 3, wherein the suspension rings are arranged in a checkerboard layout, and numbers in horizontal and vertical directions are at least 4 respectively.

8. The dangling net cloth device for suppressing flutter of a sea-crossing bridge according to claim 4, wherein the suspension rings are arranged in a checkerboard layout, and numbers in horizontal and vertical directions are at least 4 respectively.

9. The dangling net cloth device for suppressing flutter of a sea-crossing bridge according to claim 1,
wherein the cable chains are galvanized metal chains or high-strength nylon fiber ropes with a length of 2-4 m;
the node connectors are made of high-strength galvanized steel;
the net material is a metal net, a high-strength nylon rope net or canvas; and
the balance weights are reinforced concrete blocks, and the number thereof is determined according to the actual vibration characteristics of the bridge and the size of the net cloth.

10. The dangling net cloth device for suppressing flutter of a sea-crossing bridge according to claim 6,
wherein the cable chains are galvanized metal chains or high-strength nylon fiber ropes with a length of 2-4 m;
the node connectors are made of high-strength galvanized steel;
the net material is a metal net, a high-strength nylon rope net or canvas; and
the balance weights are reinforced concrete blocks, and the number thereof is determined according to the actual vibration characteristics of the bridge and the size of the net cloth.

* * * * *